United States Patent [19]

Schulein

[11] 4,015,557
[45] Apr. 5, 1977

[54] VEHICLE DISPLAY ASSEMBLY
[76] Inventor: Joseph Schulein, 2405 NW. 88th St., Vancouver, Wash. 98665
[22] Filed: Sept. 15, 1975
[21] Appl. No.: 613,118
[52] U.S. Cl. .............................. 116/42; 40/129 C; 116/173
[51] Int. Cl.$^2$ ......................................... B60Q 1/52
[58] Field of Search ................... 116/173, 174, 42; 40/129 C, 10 R, 125 R

[56] References Cited
UNITED STATES PATENTS

| | | | |
|---|---|---|---|
| 1,202,493 | 10/1916 | Dollenberg | 116/42 |
| 1,453,911 | 5/1923 | Browne | 116/42 |
| 2,445,606 | 7/1948 | Davis | 40/129 C |
| 2,534,117 | 12/1950 | Flick | 116/173 |
| 3,158,132 | 11/1964 | Guthrie | 116/173 |
| 3,239,957 | 3/1966 | Snediker | 116/174 |
| 3,672,323 | 6/1972 | Hawes | 40/129 C |
| 3,703,152 | 11/1972 | Morton | 40/129 C |
| 3,715,821 | 2/1973 | Hawes | 116/173 |
| 3,738,039 | 6/1963 | De Furia | 40/129 C |
| 3,762,360 | 10/1973 | Hawes | 40/129 C |

Primary Examiner—S. Clement Swisher
Assistant Examiner—Denis E. Corr
Attorney, Agent, or Firm—Kolisch, Hartwell, Dickinson & Stuart

[57] ABSTRACT

A display assembly for use on a vehicle such as an automobile arranged to communicate a visual message indicating distress when the automobile or its occupants require aid. A generally U-shaped carrying clip is supportably disposed on an upper margin of a side window and provides a rigid carrier for an elongated rod which is inserted through apertures in the clip. The generally U-shaped clip has two depending side members joined by a connecting portion which are disposed on opposite sides of the window to enable contact of the inserted rod with the upper margin of the side window to allow frictional contact between the upper margin and the elongated rod when the side window is substantially closed pressing the connecting portion against the side window's upper rest. A visual message arranged on a flag or placard may be attached to the elongated rod and extends outwardly from the side window substantially normal to the longitudinal axis of the vehicle for communication to oncoming and upcoming vehicular traffic.

6 Claims, 4 Drawing Figures

VEHICLE DISPLAY ASSEMBLY

BACKGROUND OF THE INVENTION

The present invention relates to a device for indicating that a vehicle is in distress or that its occupants need assistance, and is more particularly directed to a side window-mounted display assembly which locates a flag or the like substantially perpendicular to the window for clear viewing to oncoming and upcoming traffic.

In today's world of heavy highway travel, it is well known that automobiles may become disabled due to mechanical failure, lack of fuel, etc. which requires that the vehicle be correspondingly directed to a side port: of a highway. To permit such an incapacitated vehicle to remain on a side shoulder invites accidents or other damage. Furthermore, the driver of an automobile may become physically incapacitated and decide to remove the vehicle to an off-highway position. In both of the aforementioned situations, it may become desirable to display a visual message to oncoming and upcoming traffic to communicate a requirement for assistance.

Various devices have been proposed to indicate that a vehicle is in distress or that its occupants may be require help. For instance, flares may be employed around the front and rear of the vehicle to display a small controlled burn indicating distress or danger. However, it is readily apparent that flares have a limited time during which they can be used before becoming depleted of burning powder. Also, it is apparent that if a driver becomes incapacitated, it would be difficult for such a person to remove himself from the vehicle, strike the flares to initiate ignition and place them in appropriate warning positions. Of course, an individual can physically stand either in front of or behind the vehicle and through gesticulation indicate to passing motorists that the vehicle or its occupants are in distress. Such a method, however, invites potential injury to the individual as well as creating a dangerous condition to surrounding traffic.

Another method of distress signaling takes the form of using a placard disposed in either the front or rear as well as the side windows of an incapacitated automobile for indicating the need for assistance. However, it is readily apparent that if the placard is displayed in the rear window, traffic approaching from the front of the distressed vehicle will be unable to view same. Thus, it becomes necessary to carry two placards which may become somewhat cumbersome. In addition, if a placard is placed in a position adjacent the front or rear window, a passing motorist may be virtually unable to read the request for assistance because of the sun glaring off the window. The use of a placard on a sidw window would require a passing motorist to view same at the exact instant of parallel relationship between the vehicles. Such a condition would result in only chance awareness of the distressed vehicle.

The present invention contemplates the novel use of a visual message communicating a desire for assistance which is attached to an elongated rod extending outwardly from a vehicle side window substantially normal to the longitudinal axis of the vehicle. The elongated rod is inserted through apertures in a generally U-shaped clip, the clip having depending side portions which are disposed on opposite sides of the side window. When the side window is substantially closed, an upper margin of the side window contacts the rod for frictional engagement therebetween, and a shoulder portion of the clip is pressed upwardly against the window rest to thereby secure the clip and rod structure substantially rigid. Because the visual message is displayed substantially normal to the longitudinal axis of the vehicle, the message will be readily seen by traffic approaching the front and rear of the vehicle. Furthermore, it is contemplated that the present invention will be constructed of a size to readily communicate a large, easily readable distress message.

SUMMARY OF THE INVENTION

It is an object of the present invention to provide a removable display assembly for use on a vehicle side window which may be rapidly placed thereon to communicate a visual message to oncoming and upcoming vehicular traffic.

Another object of the present invention is to provide a generally U-shaped clip through which an elongated rod is inserted so that the clip may be supportably disposed on a vehicle's side window to display a visual message positioned to extend outwardly from the side window substantially normal to the longitudinal axis of the vehicle for enabling passing motorists to readily view the distress signal desired to be communicated.

A further object of the present invention is to provide a removable display assembly which may be readily transported in the vehicle in a nonassembled configuration which may be readily placed in assembled position on a side window. Correspondingly, it is contemplated that the present invention will utilize an elongated rod to which a visual message may be attached thereto.

Yet a further object of the present invention is to provide a removable display assembly which will be substantially rigidly secured by a substantially closed window so that draft conditions caused by passing vehicles will not inadvertently blow away or otherwise damage the attached visual message.

Additional objects of the present invention reside in the specific construction of the exemplary assembly hereinafter particularly described in the specification and shown in the several drawings.

BRIEF DESCRIPTION OF THE DRAWINGS

Novel features of the removable display assembly in accordance with the present invention will be more readily understood from a consideration of the following description taken together with the accompanying drawing, in which a preferred adaptation is illustrated with the various parts thereof identified by suitable reference characters in each of the views and in which.

DETAILED DESCRIPTION OF THE INVENTION

Figure 1:
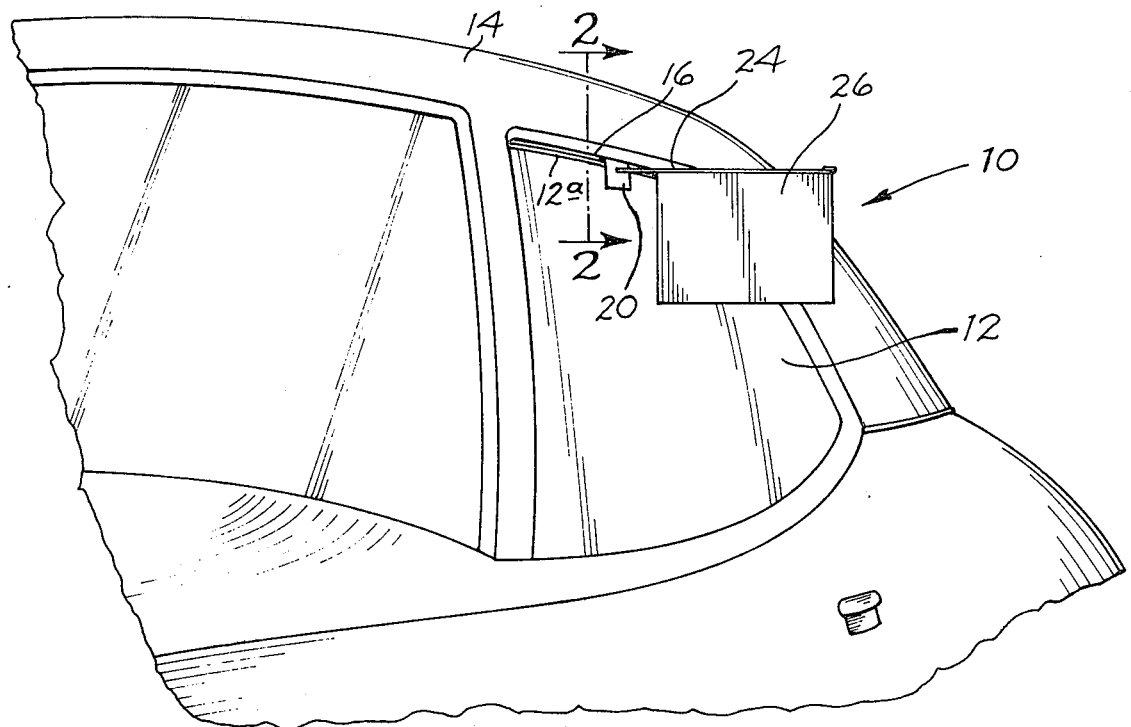
FIG. 1 is a partial perspective view of an automobile with the removable display assembly of the present invention in operative position for displaying a visual message to oncoming and upcoming traffic.
Figure 4:
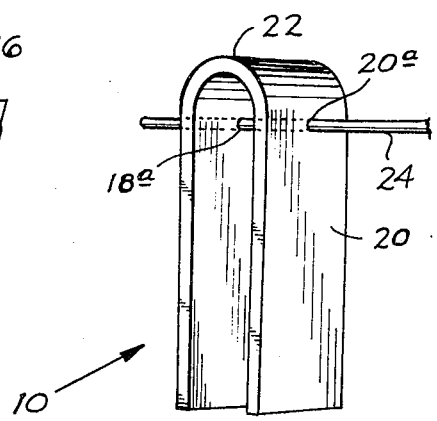
FIG. 4 is a perspective view of the present invention indicating the insertion of an elongated rod in the window clip.

Referring initially to FIGS. 1 and 4, an embodiment of the removable display assembly of the present invention is generally designated at 10. Removable display assembly 10 is arranged to be disposed on a side window 12 of a vehicle 14. Vehicle 14 includes an upper rest 16 which serves as a seat for margin 12a of window 12 when same is in closed position. Rest 16 is commonly constructed of a rubber material or soft noise-absorbant construction. Considering FIG. 4, details of the present invention may be more readily understood. The removable display assembly 10 is conveniently constructed as a generally U-shaped clip having depending portions 18 and 20 which are joined by a curved connecting shoulder or portion 22. Apertures 18a and 20a provided in flaps 18 and 20, respectively, to permit insertion of an elongated display rod 24 which is arranged to have secured thereto a visual message for communicating a distress signal or the like to oncoming an upcoming vehicular traffic. The visual message may be arranged on a flag, pennant, placard or the like 26.

Figure 2:
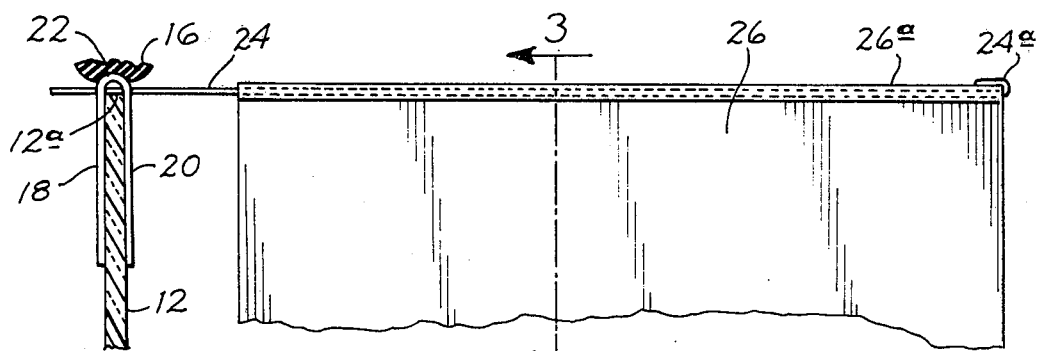
FIG. 2 is a view taken along lines 2—2 of FIG. 1 and illustrates in more detail component features of the present invention.
Figure 3:
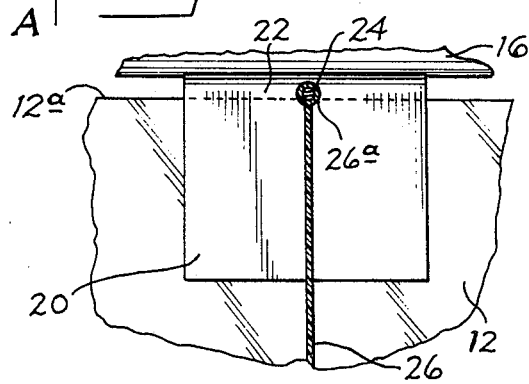
FIG. 3 is a view taken along lines 3—3 of FIG. 2.

Assuming that the removable display assembly is originally unassembled, and a vehicle becomes incapacitated or its driver is desirous of physical attention, the following steps may be employed to communicate a desire for aid from approaching traffic. Initially, the vehicle is removed to a side portion of a roadway and halted from further travel. Window 12 is then wound up or down to an extent sufficient to permit placement of clip assembly 10 so that depending portions 18 and 20 are on opposite sides of window 12. Elongate rod 24 is inserted through apertures 18a and 20a to permit a portion of rod 24 to rest on upper margin 12a of window 12. A visual message is displayed on flag 26 which is secured by any convenient means to outwardly extending rod 24. In FIGS. 2 and 3, it may be seen that flag 26 has an elongated pouch or sleeve 26a which receives rod 24. Additionally, rod 24 incorporates an integrally formed hook or other retainer 24a which may prevent inadvertent longitudinal removal of flag 26 from elongated rod 24. With placement of clip assembly 10 on window 12 with elongated rod 24 inserted through apertures 18a and 20a, window 12 may be wound upwardly to a substantially closed position so that connecting shoulder portion 22 is firmly seated against rest 16. With pressure being applied form window 12 against rod 24 which correspondingly presses connecting portion 22 against seat 16, it may be readily appreciated that a substantial frictional force will develop between the portion of the elongated rod 24 between flaps 18 and 20 and upper margin 12a of window 12. The frictional force will substantially prevent removal in a longitudinal direction of rod 24 from clip assembly 10. Thus, it may be appreciated that removable display assembly 10 of the present invention may be maintained as a substantially rigid assembly not subject to becoming disassembled due to wind or draft conditions caused by weather and passing vehicular traffic.

Furthermore, it is contemplated that removable display assembly 10 of the present invention may be constructed with a flag or pennant of substantial size so that a visual message may be readily viewed. It can be additionally appreciated that the outward extension from the side window 12 substantially normal to the longitudinal axis of vehicle 14 of elongated rod 24 enables visual display of a message which may be readily viewed from either oncoming or upcoming traffic. Hopefully, a distress signal will be recognized by a passing motorist who will take appropriate steps to see that aid is forthcoming.

It is additionally contemplated that placards distributed by various automobile associations may be readily attached to rod 24 for assembly into clip assembly 10.

The present invention provides for a removable display assembly 10 which may be relatively compactly stored in an automobile's glovebox or console for convenient accessibility.

While the invention has been particularly shown and described with reference to the foregoing embodiment herein, it will be understood by those skilled in the art that other changes in form and detail may be made without departing from the spirit and scope of the invention as defined in the appended claims. For instance, while it is contemplated that clip assembly 10 be constructed of plastic with a metal rod 24, other materials may be readily employed. Also, connecting portion 22 may be formed of virtually any configuration and need not necessarily be a curved shoulder as indicated in the drawings.

What is claimed is:

1. A removable display assembly for use on a vehicle arranged to communicate a visual message to oncoming and upcoming vehicular traffic comprising:
   carrying means including a clip having laterally opposed side members joined by an interconnecting portion, said portion positionable over the upper margin of a side window such that said side members are disposed on opposite sides of the window, said clip also including at least one aperture; and
   elongate rod means insertable through said aperture for permitting the upper margin of a substantially rolled up side window to press against said rod means such that said connecting portion will be urged upwardly for contact against the side window's uppwer rest, said rod means being frictionally engaged against the upper margin and extending from the side window for displaying an attached visual message.

2. A removable display assembly as described in claim 1 wherein said elongated means comprises a rod having means integrally formed thereon for preventing inadvertent removal of a visual message attached thereto.

3. A removable display assembly as described in claim 2 wherein said visual message is arranged on a flag or the like secured to said elongated means.

4. In combination, a vehicle having a side window with an upper margin seatable against a rest when closed and a removable display assembly for use thereon arranged to communicate a visual message to oncoming and upcoming vehicular traffic comprising:
   carrying means including a clip having laterally opposed side members joined by an interconnecting portion, said portion positionable over the upper margin of a side window such that said side members are disposed on opposite sides of the window, said clip also including at least one aperture; and
   elongate rod means insertable through said aperture for permitting the upper margin of a substantially rolled up side window to press against said rod means such that said connecting portion will be urged upwardly for contact against the side window's upper rest, said rod means being frictionally engaged against the margin and extending from the side window for displaying an attached visual message.

5. A combination as described in claim 4 wherein said elongated means comprises a rod having means integrally formed thereon for preventing inadvertent removal of a visual message attached thereto.

6. A combination as described in claim 5 wherein said visual message is arranged on a flag or the like which fixingly engages said elongated means.

* * * * *